United States Patent [19]

Suzuki et al.

[11] 4,242,177
[45] Dec. 30, 1980

[54] METHOD FOR OXIDIZING MALODOROUS SULFUR COMPOUNDS IN KRAFT COOKING LIQUOR

[75] Inventors: Masayuki Suzuki; Nobuo Onuma; Fumihiko Ishizuka; Shinichi Hara, all of Hachinohe; Akira Osawa, Ichikawa; Akira Fukuzawa, Yokohama, all of Japan

[73] Assignees: Mitsubishi Paper Mills, Ltd.; Mitsubishi Heavy Industries, Ltd., both of Tokyo, Japan

[21] Appl. No.: 932,198

[22] Filed: Aug. 9, 1978

Related U.S. Application Data

[63] Continuation of Ser. No. 774,952, Mar. 7, 1977, abandoned.

[30] Foreign Application Priority Data

Apr. 7, 1976 [JP] Japan .................................. 51-38917

[51] Int. Cl.³ ...................... D21C 3/02; D21C 11/04; D21C 11/08
[52] U.S. Cl. ........................................ 162/17; 162/31; 162/42; 162/44; 162/51; 210/758; 210/765

[58] Field of Search .................. 162/30 R, 31, 38, 39, 162/42, 45, 51, 17, 29, 37, 43, 44; 423/206, DIG. 3; 210/60, 63 R; 422/5

[56] References Cited

U.S. PATENT DOCUMENTS

| 3,216,887 | 11/1965 | Landmark | 162/38 |
| 3,362,868 | 1/1968 | Backlund | 162/30 K |
| 3,963,561 | 6/1976 | Richter | 162/17 |

FOREIGN PATENT DOCUMENTS 1074391 1/1960 Fed. Rep. of Germany ........ 210/63 R

OTHER PUBLICATIONS

In Digestor Black Liquor Oxidation for Odor Control in Kraft Pulping, McKean et al., EPA, Jan. 1974.

Primary Examiner—Peter F. Kratz
Attorney, Agent, or Firm—Cushman, Darby & Cushman

[57] ABSTRACT

A method for oxidizing and removing remaining sodium sulfide as well as generated sulfur compounds by introducing oxygen into cooking liquor at high temperature and high pressure in the end stage of kraft cooking.

14 Claims, 3 Drawing Figures

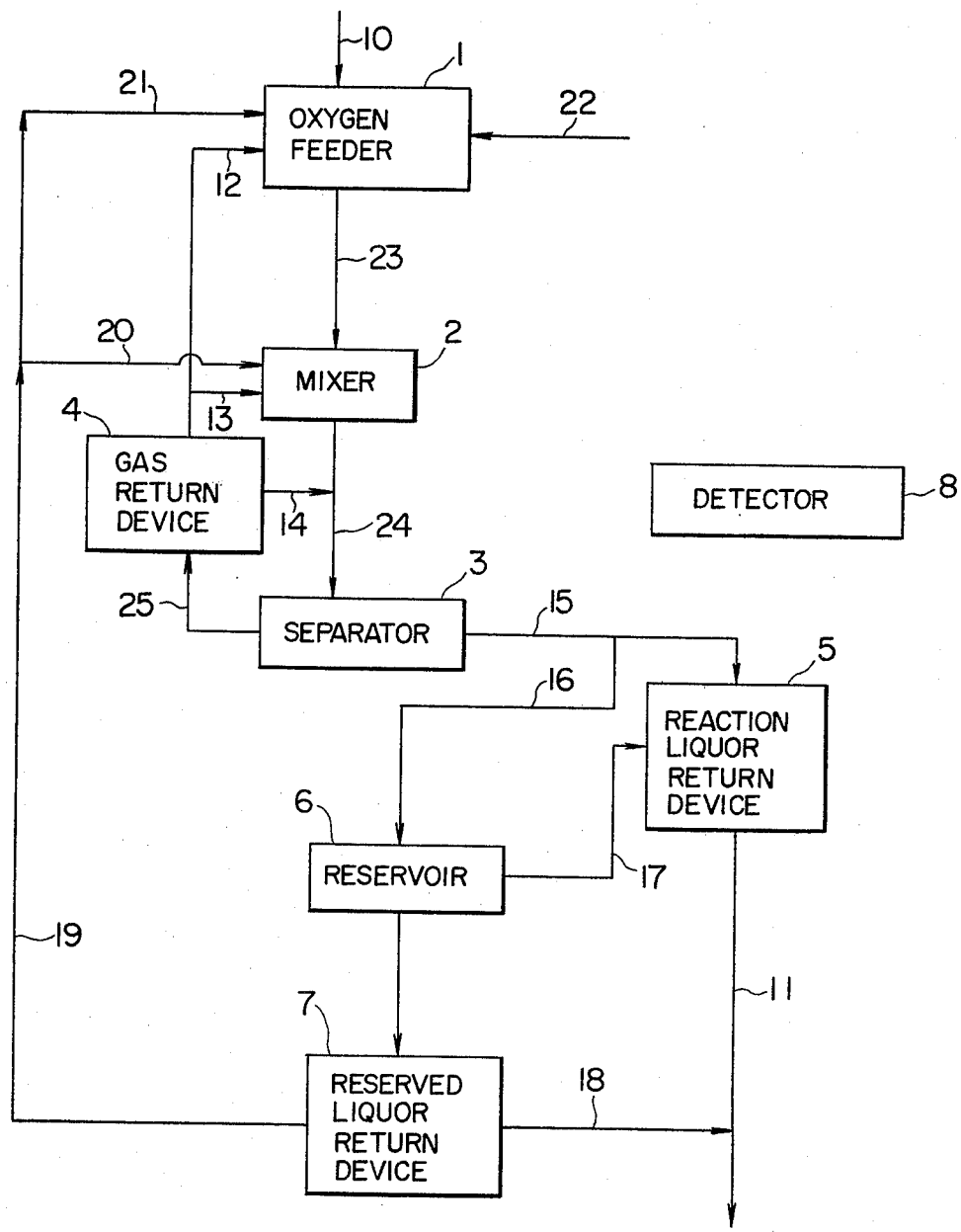

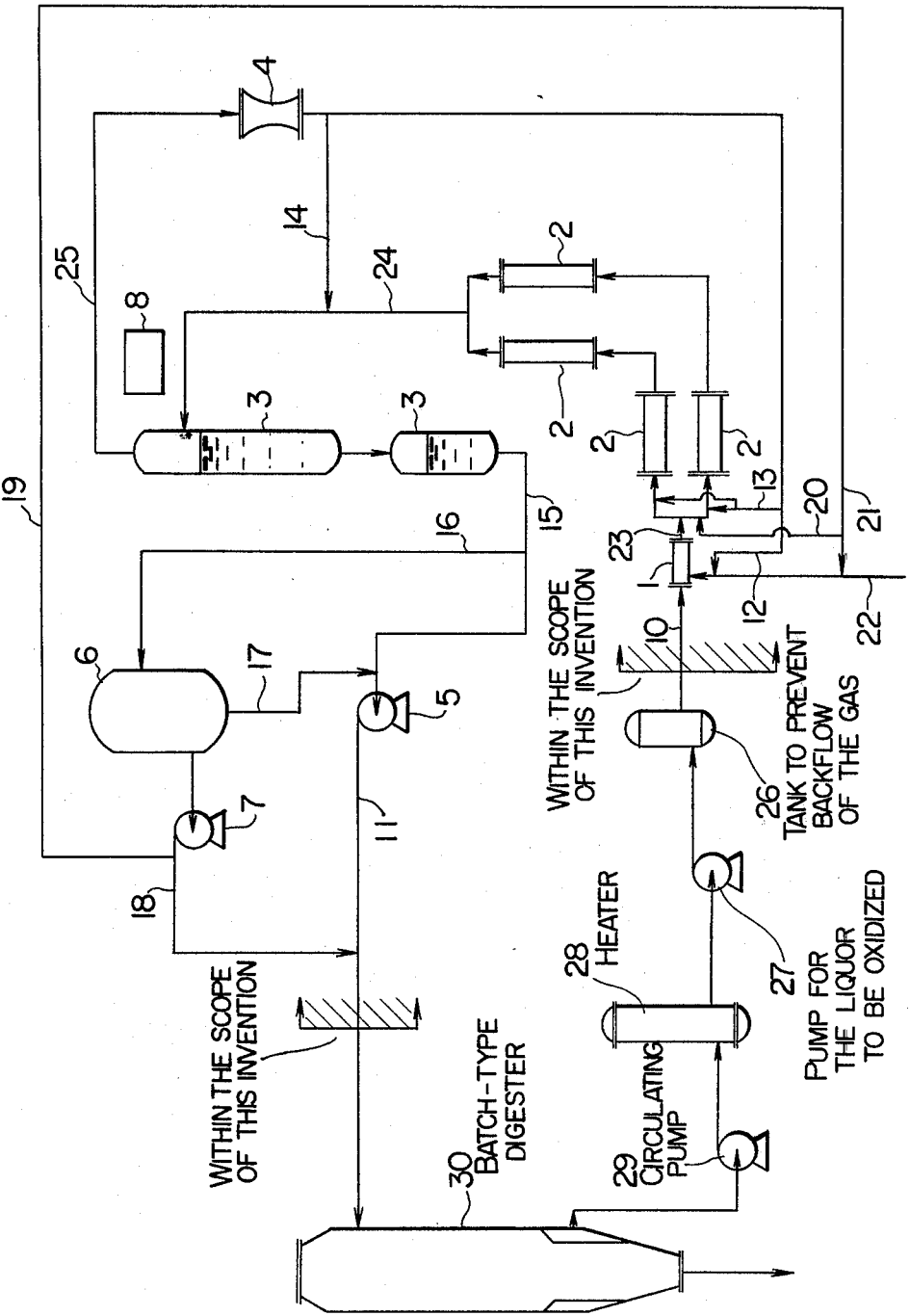

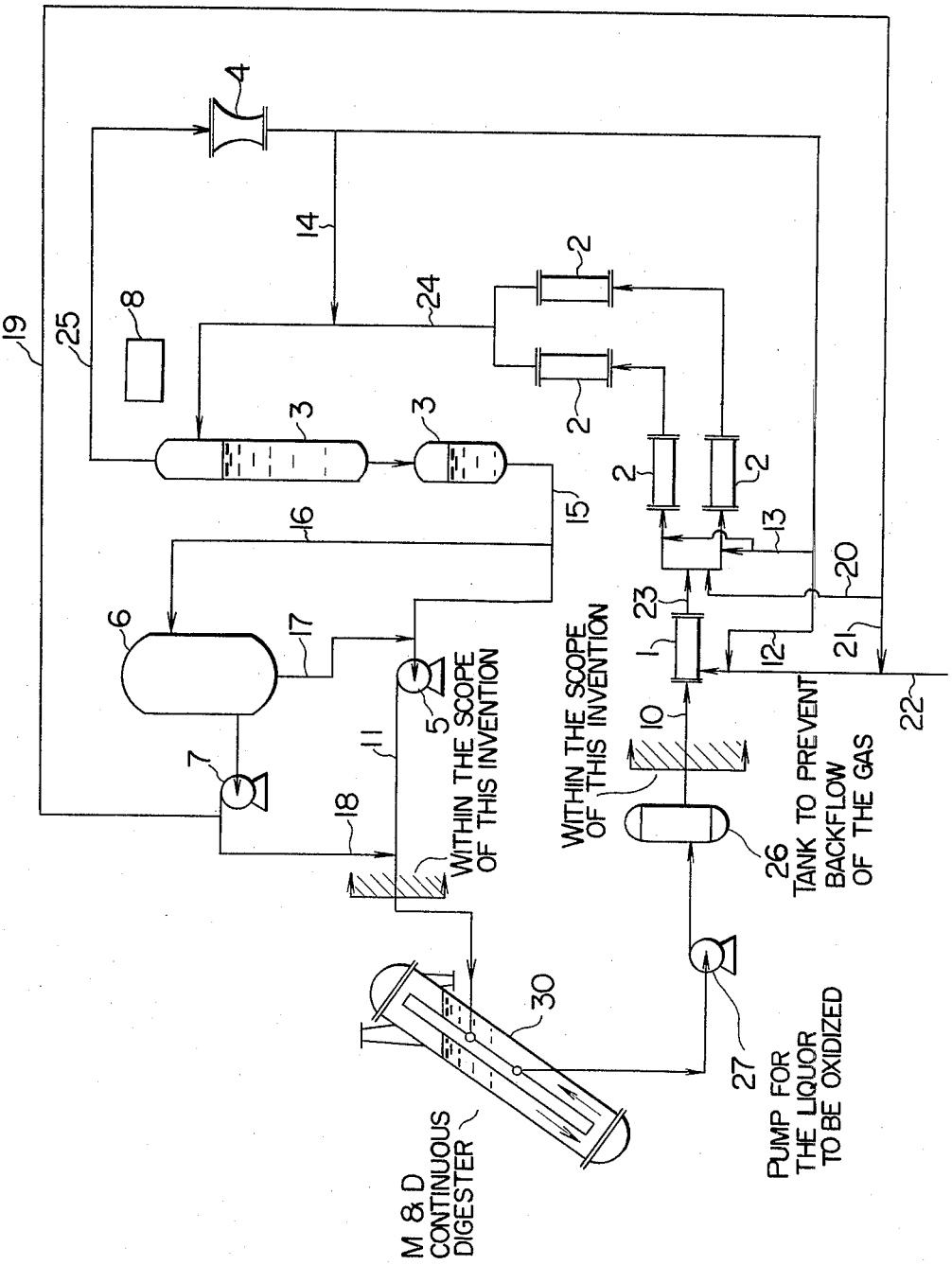

METHOD FOR OXIDIZING MALODOROUS SULFUR COMPOUNDS IN KRAFT COOKING LIQUOR

This is a continuation of application Ser. No. 774,952 filed Mar. 7, 1977, now abandoned.

BACKGROUNDS OF THE INVENTION

This invention relates to a method and apparatus for oxidizing and removing remaining sodium sulfide and generated malodorous sulfur compounds by introducing oxygen into the cooking liquor at high temperature and high pressure in the end stage of kraft cooking.

It has already been known in theory that malodorous substances and other potential malodorous substances of kraft cooking can be killed off by introducing oxygen into the cooking liquor. In reality, however, since a decrease of pH of the cooking liquor is effected inherently as a result of the reaction of oxygen with organic substances in the liquor, a measure must be taken to counteract adverse effects resulting from such pH decrease. While the pH decrease in an appreciable degree may help increase pulping yield and is therefore favorable, it promotes undesirable release of methyl mercaptan or the like from liquor phase to gas phase. Consequently, the introduction of oxygen loses much in its merit unless the oxidative removal of free mercaptan or the like in the gas phase is carried out at substantially the same time as oxygen is introduced into the liquor phase.

If the reaction or contact duration of oxygen with the cooking liquor, i.e. the quantity of oxygen introduced, is kept at an optimum level which is close to the minimum, the pH decrease of the cooking liquor is optimumly minimized. While this may deteriorate the favorable yield improvement achieved by the pH decrease, effect of the oxidative removal of malodorous substances can be enhanced to a maximum degree and the cost for oxygen can be also reduced.

SUMMARY OF THE INVENTION

An object of this invention is to remove efficiently malodorous sulfur compounds and other potential malodorous substances from kraft cooking liquor by introducing oxygen into the cooking liquor. In order to introduce oxygen efficiently into the cooking liquor, and to avoid excessive oxidation of organic substances dissolved in the cooking liquor, since it leads to the pH decrease of the liquor, a method has been deviced which is characterized as follows; (1) to limit oxidation reaction and duration time of oxygen with the cooking liquor within a range of several seconds to several minutes, preferably 10 seconds to 2 minutes, (2) in order to accomplish the aforesaid (1), to separate unreacted oxygen rapidly from the oxygentreated liquor and recycle it for efficient reuse, (3) to introduce oxygen at as many points of the cooking liquor system as possible, and (4) to regulate the oxygen introduction rate proportionally to the remaining sodium sulfide concentration of the cooking liquor. By applying this method, the pH decrease can be regulated, and most efficient oxidative removal of malodorous substances can be achieved.

BRIEF DESCRIPTION OF THE DRAWING

FIGS. 1, 2 and 3 represent flow diagrams of the whole apparatus to carry out the method of this invention.

DETAILED DESCRIPTION OF THE INVENTION

Major malodorous substances of the kraft cooking are hydrogen sulfide ($H_2S$), methyl mercaptan ($CH_3SH$), dimethyl sulfide ($CH_3SCH_3$) and dimethyl disulfide ($CH_3SSCH_3$). Hydrogen sulfide is formed by hydrolysis of sodium sulfide ($Na_2S$) in the cooking liquor. Sodium sulfide dissociates according to the following formula depending upon the pH condition:

$$S^{2-} + 2H^+ \xrightleftharpoons{K_2} HS^- + H^+ \rightleftharpoons H_2S$$

Since the dissociation constant $K_2$ is about $2 \times 10^{-7}$, hydrogen sulfide is liberated from alkaline cooking liquor if the liquor pH decreased below 9 to 10. When concentrated black liquor is further concentrated at such a direct contact evaporator as the cascade evaporator, hydrogen sulfide is liberated not only by neutralization of sodium hydroxide with carbon dioxide in the flue gas, but also by reaction of sodium sulfide with carbon dioxide according to the following formula:

$$Na_2S + CO_2 + H_2O \rightarrow Na_2CO_3 + H_2S$$

Methyl mercaptan formed in the cooking process is a weak acid and dissociates in the following way:

$$CH_3SH \xrightleftharpoons{K_3} CH_3S^- + H^+$$

The dissociation constant $K_3$ is $4.3 \times 10^{-11}$ and, hence, gaseous methyl mercaptan is liberated from the cooking liquor at pH below 12 to 13. On the other hand, methyl sulfide, being a neutral substance, is liberated easily regardless of the pH condition when external pressure is reduced, and transfers into gas phase from liquor phase.

In the kraft cooking process, sodium sulfide dissociates forming $HS^-$ ion, which participates in the delignification reaction and also reacts with methoxy groups of lignin forming methyl mercaptan and methyl sulfide as shown by the following formulas:

$$S^{2-} + 2H^+ \rightleftharpoons HS^- + H^+ \text{ (dissociation)}$$

$$Lig-OMe + HS^- \rightarrow MeSH + Lig-O^-$$

$$MeSH \rightleftharpoons MeS^- + H^+ \text{ (dissociation)}$$

$$Lig-OMe + MeS^- \rightarrow Me_2S + Lig-O^-$$

where Me stands for methyl group, —OMe for methoxy group, Lig— for phenylpropane unit, MeSH for methyl mercaptan, $Me_2S$ for dimethyl sulfide, and $MeS^-$ for methyl mercaptide ion.

While quantities of the malodorous substances liberated in the cooking are functions of the amount of Lig-OMe, cooking time and temperature of the cook, alkali charge, sulfidity, liquor to wood ratio, and delignification degree, it was found that the malodorous substance contents in cooking liquor occur in the ranges given in Table 1 under cooking condition given in the same table. The range of conditions given in the table, however, may not cover all of the cases of kraft pulping.

TABLE 1

Some properties of cooking liquor in the end stage of kraft pulping

| Type of wood | | Hardwood | Conifer |
|---|---|---|---|
| Cooking condition: | | | |
| Retention time, min. | | 50–100 | 50–100 |
| Maximum temperature, °C. | | 165–175 | 170–180 |
| Available alkali, % | | 15–17 | 16–19 |
| Sulfidity, % | | 15–30 | 15–30 |
| Liquor to wood ratio | | 3–4 | 4–5 |
| Kappa number | | 15–25 | 25–35 |
| Liquor in the last stage of cooking contained: | | | |
| Residual $Na_2S$, | m mole/liter | 29–240 | 15–190 |
| MeSH formed, | m mole/liter | 4.7–10.9 | 2.2–4.9 |
| $Me_2S$ formed, | m mole/liter | 1.6–4.7 | 0.8–2.1 |
| $Me_2S_2$ formed, | m mole/liter | 0.4–1.6 | 0.2–0.7 |

The malodrous substances formed during cooking and the remaining unreacted sodium sulfide, being subjected to such changes in the processes following cooking process as pH decrease, pressure drop, change in temperature, or change by chemical reactions, are discharged as malodorous substances into air or waste liquor carried by exhaust gases from Brown Stock washer hoods and black liquor tanks, exhaust gases and condensates from black liquor evaporation and concentration processes, or flue gas from recovery boiler. These malodorous substances discharged at various processes of a kraft pulping plant can be collected and treated by such methods as burning, stripping and burning, and dilute black liquor oxidation or further added-on concentrated black liquor oxidation. However, since the malodorous substances are released at variety points of the processes, such composite methods of malodor treatment become inevitably very complicated and are not always satisfactory in view of efficiency and economy.

The cooking liquor at the end stage of cooking contains dissolved organics and inorganics; the former consists mainly of lignin and of other components such as resins and carbohydrates; the latter of unreacted sodium hydroxide and sodium sulfide, and other sodium salts.

When oxygen is introduced into the end stage cooking liquor under a high temperature-pressure condition, sodium sulfide is rapidly and intensively oxidized to sodium thiosulfate passing over a stage of oxidation to molecular sulfur which is reached by low-temperature oxidation.

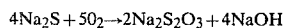

$$4Na_2S + 5O_2 \rightarrow 2Na_2S_2O_3 + 4NaOH$$

On introduction of oxygen, methyl mercaptan, dimethyl sulfide, and dimethyl disulfide undergo complicated reaction, but the final product of them is methyl sulfonic acid which is odorless. On the other hand, oxygen reacts also with organic substances dissolved in the cooking liquor, resulting in formation of carbon monoxide, carbon dioxide, and various organic acids which leads to pH decrease in one form or another. As mentioned before, the pH decrease promotes liberation of methyl mercaptan and the like into gas phase resulting in accumulation of malodorous substances in that phase; methyl mercaptan and the like liberated by the pH decrease from their stably dissolved form as sodium salts in the cooking liquor at higher pH no more dissolve again in the cooking liquor of the decreased pH. These liberated malodorous substances in the gas phase can be oxidized and removed by introducing oxygen once again into the gas phase. In this case where oxygen reintroduced into the gas phase, the actually consumed oxygen means the sum of both the liquor-phase-introduced oxygen and the gas-phase-introduced oxygen.

The pH decrease, it was found, is caused mainly by excessive oxidation of the dissolved organics by oxygen, and this can be restricted efficiently by the following ways; to introduce oxygen in divided streams into the cooking liquor at points as many as possible, to separate and remove rapidly the unreacted oxygen from the liquor so as to limit oxygen's reaction and contact duration with the cooking liquor within the range of several seconds to several minutes, preferably 10 seconds to two minutes, to regulate the oxygen introduction rate proportional to sodium sulfide concentration of the circulating liquor, and to recycle the separated unreacted oxygen to the oxidation zone for economic re-use.

The amount of oxygen to be introduced is 1.5 to 5 moles, preferably 1 to 2 moles, per one mole of the remaing sodium sulfide, depending on the rather widely variable concentrations of sodium sulfide and malodorous substances such as methyl mercaptan, etc, as shown in Table 1, and variation of their ratio relative to organics in the cooking liquor and of reaction rates. As an oxygen source, oxygen-containing gas, e.g. liquid air, compressed air, or oxygen-enriched air, may be used with comparable results. A gas containing 0.2 mole or more of oxygen is generally used.

This invention provides a method to remove malodorous substances and an apparatus to materialize it. This method is characterized by that it comprises introducing oxygen or an oxygen-containing gas into cooking liquor of the digester's liquor circulating system at one or more points to let the oxygen react, separating the unreacted oxygen or the unreacted oxygen-containing gas from the reaction liquor, and recycling the separated unreacted oxygen or oxygen-containing gas to the reaction zone, while returning the oxidized reaction liquor to said circulating system or directly to the digester, or storing temporarily in a vessel a portion or whole of the oxygen-separated reaction liquor thereafter returning it to the reaction zone, circulating system, or digester.

The "end stage of cooking", as herein referred to, is the cooking stage toward the substantial completion of cooking and involves a certain period of time which varies according to cooking conditions and other factors; in other words, it means a state after completing a course of cooking where delignification rate or consumption rate of $SH^-$ ion has shifted from initial high level to lower level.

The "reaction zone" as herein referred to implies a zone of the cooking liquor circulation system beginning from the point where oxygen is introduced into the liquor, mixed and reacts with the liquor up to the point where unreacted portion of the oxygen is separated from the liquor to terminate the oxidation reaction.

According to the invention, the net amount of oxygen fed to the cooking liquor is equal to the amount of oxygen consumed by malodorous substances and sodium sulfide and no oxygen is consumed by excessive oxidation of organics in the liquor, provided that, as mentioned before, no oxygen may be fed additionally into the gas phase and consumed therein.

The invention is illustrated below with reference to the accompanying drawings. FIG. 1 is a flow diagram for the apparatus to carry out the method of this invention. The cooking liquor is fed to the apparatus through line 10. The reacted liquor or the temporally stored liquor leave the apparatus through lines 11 and 18, respectively. The cooking liquor is usually fed through a switch-over valve from the liquor circulation system of a digester. In the case of a continuous digester which is usually provided with multiple liquor circulation systems, the apparatus can be incorporated to suitable one of such systems. Thus, the liquor fed through line 10 to the apparatus can be either the cooking liquor itself or that drawn from the circulation system.

Oxygen is introduced through line 22 into the cooking liquor at oxygen feeder 1. The number of oxygen feeder 1 is one or more, preferably 1 to 5, so that oxygen can be introduced dividedly at those feeders. The cooking liquor loaded with oxygen passes through line 23 and mixed at mixer 2 and oxidation takes place therein. Oxygen feeder 1 and mixer 2 can be so constructed that oxygen introduction and mixing may be carried out substantially simultaneously; or, pairs of oxygen feeder 1 and mixer 2 can be put in series to obtain the same result. The reaction liquor from mixer 2 is led through line 24 to separator 3 wherein the unreacted oxygen which has been mixed and in contact with the reaction liquor is separated together with vapor and inert nitrogen and carbon dioxide gases. The separated gases containing the unreacted oxygen is recycled to the reaction zone by way of line 25, gas return device 4, and line 12, 13, or 14; provided, however, that if the separated gases contain less than 0.1 mole fraction of oxygen and have weaker oxidizing power than air, they may be purged from the apparatus and subjected to treatments such as burning and the like.

Whether to recycle or to purge the separated gases is regulated efficiently by measuring the oxygen concentration in the gases by means of detector 8. The detector 8 may also be invested with a function as a controller to detect possibility of an explosive reaction between the oxygen and combustible methyl mercaptan or hydrocarbons which may be contained in the separated gases, and to eliminate such possibility by injecting nitrogen or other inert gases into the separated gases.

The amount of oxygen introduced is regulated, by reference to the amount of existing sodium sulfide in the liquor which is either predicted or measured on-line, to such that the molar ratio of oxygen to sodium sulfide is in the range of 0.5–5 to 1, preferably 1–2 to 1. The reaction or contact duration of oxygen with the reaction liquor passing oxygen feeder 1, mixer 2, through separator 3 should be in the range of several seconds to several minutes, preferably 10 seconds to 2 minutes.

The oxygen-separated reaction liquor from separator 3 is returned eventually to the liquor circulating system of the digester or directly to the digester by means of reaction liquor return device 5 and through line 11.

In a case where this apparatus is applyed to batch digesters, though not limited to the case, it is suitable to draw a part or whole of the liquor through branch line 16 from line 15 which leads to reaction liquor return device 5 to reservoir 6 to be temporarily stored therein. This helps ensure uninterrupted cooking operations of the batch digesters. The storage period of time does not exceed the cover-to-cover time of the digester which is usually 2 to 4 hours including chip packing, cooking and blowing; the temporarily stored liquor is eventually returned by the end of the cook or of the next cook at the latest to either the liquor circulating system or directly to the digester through line 17 or 18 by means of reserved liquor return device 5 or 7 respectively; or, alternatively, it may be returned through line 19 to the reaction zone by one of the two routes— i.e. (1) through line 20 to mixer 2 and (2) through line 21 to oxygen feeder 1.

If proper number of reservoir(s) 6 of suitable capacities are to be installed, one unit of the reaction zone comprising oxygen feeder(s) 1, mixer(s) 2, and separator 3, can serve to more than one batch digesters even when they cook different grades using liquors of different composition. The proper temporary storage amount and time of the reaction liquor may be determined according to such different condition.

FIGS. 2 and 3 show examples of application of the present apparatus to a batch digester and a continuous digester, wherein the reference numbers correspond to those employed in FIG. 1.

In addition to the apparatus as described in FIG. 1 there is shown in FIG. 2 the other portions of the apparatus for use with a batch type digester, namely, tank 26 to prevent backflow of the gas, pump 27 for the liquor to be oxidized, heater 28, circulating pump 29 and batch type digester 30. Likewise FIG. 3 shows in addition to the apparatus described in FIG. 1 the remainder of the apparatus for use with a continuous digester, namely, tank 26 to prevent backflow of the gas, pump 27 for the liquor to be oxidized and M & D continuous digester 30.

EXAMPLE

Several cooking liquors of the end stage cooking obtained from the cooks carried out under the different conditions as shown in Table 1 were subjected to oxidation according to this invention. The results obtained are shown in Table 2.

TABLE 2

| Run No. | | I | II | III | IV |
|---|---|---|---|---|---|
| Condition for oxidation treatment | | | | | |
| Flow rate of cooking liquor, liter/second | | — | 300 | 100 | 50 |
| $Na_2S$ concentration in liquor, m mole/liter | | 100 | 100 | 100 | 100 |
| Flow rate of $Na_2S$, mole/sec. | | — | 30 | 10 | 5 |
| Rate of oxygen introduced *1, | 1, mole/sec. | 0 | 135 | 15 | 2.5 |
| " | 2, mole/sec. | 0 | 0 | 15 | 3.5 |
| " | 3, mole/sec. | 0 | 0 | 0 | 1.5 |
| Total rate of oxygen introduced, mole/sec. | | 0 | 135 | 30 | 7.5 |
| Molar ratio of oxygen to $Na_2S$ | | 0 | 4.5 | 3.0 | 1.5 |
| Reaction duration *2, sec. | | 0 | 20 | 60 | 120 |
| Result of treatment | | | | | |
| $Na_2S$ concentration in liquor, m mole/liter | | 100 | 2.5 | 4 | 3 |
| MeSH concentration in liquor, m mole/liter | | 11 | 0.9 | 0.8 | 1.1 |
| pH of liquor | | 13.2 | 12.8 | 13.0 | 13.0 |
| Percentage removal of $Na_2S$, % | | 0 | 97.5 | 96.0 | 97.0 |
| Percentage removal of MeSH, % | | 0 | 91.8 | 92.7 | 90.0 |

TABLE 2-continued

| Run No. | I | II | III | IV |
|---|---|---|---|---|
| Decrease in pH | 0 | 0.4 | 0.2 | 0.2 |

Note:
*¹ 1, 2, and 3 mean that oxygen was introduced into the oxygen feeder at one, two, and three points, respectively.
*² Reaction duration is the period of time, during which oxygen is introduced into, mixed with, and separated from the cooking liquor.

In Run No. I, the cooking liquor was not treated with oxygen. In Run No. II, oxidation was carried out for 20 seconds according to this invention by introducing 4.5 moles of oxygen per mole of sodium sulfide into the oxygen feeder at single point. In Run No. III, oxidation was carried out for 60 seconds according to this invention by introducing 3 moles in total of oxygen per mole of sodium sulfide into the oxygen feeder at two separate points. In Run No. IV, oxidation was carried out for 120 seconds according to this invention by introducing 1.5 moles in total of oxygen per mole of sodium sulfide into the oxygen feeder at three separate points.

It is apparent that as compared with Run No. I, in Run Nos. II, III, and IV sodium sulfide and methyl mercaptan were removed in very high degrees.

According to the present invention, as described in the foregoing, malodorous substances and potential sources thereof, which were serious drawbacks of the kraft pulping process can be efficiently and economically disposed of in the cooking process and there are no needs of complicated waste disposal systems to treat exhauste gases and condensates discharged from processes following the cooking process. The present invention may therefore contribute greatly to the benefit of pulping industry.

What is claimed is:

1. A method for removing malodorous substances formed in kraft pulp cooking process by oxidizing at a high temperature and high pressure the cooking liquor in the end stage of cooking, which method is characterized by introducing oxygen or an oxygen-containing gas into said liquor at one or more points of a liquor circulating system of a digester to allow the oxygen to react with the liquor, separating the unreacted oxygen or the unreacted oxygen-containing gas from the reaction liquor and recycling it to the reaction zone, while returning the oxygen-separated reaction liquor to said circulating system or directly to the digester, or temporarily storing a part or whole of the oxygen-separated reaction liquor in a reservoir and thereafter returning it to the circulating system, or to the digester wherein the oxygen introduction rate is controlled proportionally to the remaining sodium sulfide concentration of the cooking liquor and the oxidation reaction time is limited to avoid excessive oxidation of organic substances dissolved in the cooking liquor and to minimize the pH decrease of the cooking liquor.

2. A method according to claim 1, wherein the amount of oxygen introduced is 0.5 to 5 moles per mole of sodium sulfide present in the cooking liquor.

3. A method according to claim 2, wherein the oxygen or the oxygen-containing gas is introduced at 1 to 5 points of the circulating system.

4. A method according to claim 3, wherein the reaction of oxygen or the oxygen containing gas with the cooking liquor is carried out for 10 seconds to 2 minutes.

5. A method according to claim 2 wherein the reaction of oxygen or the oxygen containing gas with the cooking liquor is carried out for 10 seconds to 2 minutes.

6. A method according to claim 1 wherein the oxygen or the oxygen containing gas is introduced at 1 to 5 points of the circulating system.

7. A method according to claim 1 wherein the pulp is made from hardwood or from conifer and the maximum cooking temperature when the pulp is made from hardwood is 165°–175° C. and the maximum cooking temperature when the pulp is made from conifer is 170°–180° C.

8. A method according to claim 7 wherein the amount of oxygen introduced is 0.5 to 5 moles per mole of sodium sulfide present in the cooking liquor and the reaction of oxygen or the oxygen containing gas with the cooking liquor is carried out for 10 seconds to 2 minutes.

9. A method according to claim 7 wherein with hardwood the residual $Na_2S$ is 29–240 m mole/liter when the kappa number is 15–25 and wherein with conifer the residual $Na_2S$ is 15–190 m mole/liter when the kappa number is 25–35.

10. A method according to claim 9 wherein the amount of oxygen introduced is 0.5 to 5 moles per mole of sodium sulfide present in the cooking liquor.

11. A method according to claim 9 wherein the oxygen or the oxygen-containing gas is introduced at 1 to 5 points of the circulating system.

12. A method according to claim 9 wherein the reaction of oxygen or the oxygen containing gas with the cooking liquor is carried out for 10 seconds to 2 minutes.

13. A method according to claim 10 wherein the reaction of oxygen or the oxygen containing gas with the cooking liquor is carried out for 10 seconds to 2 minutes.

14. A method according to claim 13 wherein the oxygen or the oxygen containing gas is introduced at 1 to 5 points of the circulating system.

* * * * *